United States Patent [19]
Temple et al.

[11] Patent Number: 6,089,698
[45] Date of Patent: Jul. 18, 2000

[54] NOZZLES AND METHODS OF AND APPARATUS FOR FORMING NOZZLES

[75] Inventors: Stephen Temple, Cambridge; Mark Shepherd, Royston, both of United Kingdom

[73] Assignee: Xaar Technology Limited, Cambridge, United Kingdom

[21] Appl. No.: 08/256,929

[22] PCT Filed: Feb. 5, 1993

[86] PCT No.: PCT/GB93/00250

§ 371 Date: Jul. 28, 1994

§ 102(e) Date: Jul. 28, 1994

[87] PCT Pub. No.: WO93/15911

PCT Pub. Date: Aug. 19, 1993

[30] Foreign Application Priority Data

Feb. 5, 1992 [GB] United Kingdom .................. 9202434

[51] Int. Cl.[7] .................. B41J 2/14; B41J 2/16; B41J 2/045
[52] U.S. Cl. .................. 347/47; 219/121.7; 29/890.1
[58] Field of Search .................. 347/47, 45, 65; 219/121.7, 121.71, 12.68, 121.72, 121.73, 121.74, 121.75, 121.76; 29/890.1

[56] References Cited

U.S. PATENT DOCUMENTS

| | | | |
|---|---|---|---|
| 3,946,398 | 3/1976 | Kyser et al. | 347/45 |
| 4,379,304 | 4/1983 | Heinzl et al. | 347/47 |
| 5,189,437 | 2/1993 | Michaelis et al. | 347/47 |
| 5,208,604 | 5/1993 | Watanabe et al. | 347/47 |
| 5,208,980 | 5/1993 | Hayes | 29/890.1 |
| 5,237,148 | 8/1993 | Aoki et al. | 219/121.7 |
| 5,389,954 | 2/1995 | Inaba et al. | 347/47 |

FOREIGN PATENT DOCUMENTS

| | | |
|---|---|---|
| 309146 | 3/1989 | European Pat. Off. |
| 365195 | 4/1990 | European Pat. Off. |
| 367541 | 5/1990 | European Pat. Off. |
| 454152 | 10/1991 | European Pat. Off. |
| 549357 | 6/1993 | European Pat. Off. |
| 0094482 | 6/1982 | Japan . |
| 404022644 | 1/1992 | Japan . |
| 2 262 253 | 6/1993 | United Kingdom . |
| WO 86/02301 | 4/1986 | WIPO . |
| WO 91/00552 | 1/1991 | WIPO . |

*Primary Examiner*—John E. Barlow, Jr.
*Assistant Examiner*—Raquel Yvette Gordon
*Attorney, Agent, or Firm*—Marshall, O'Toole, Gerstein, Murray & Borun

[57] ABSTRACT

Nozzles for an ink jet printer are formed by laser ablation in a nozzle plate (24) which has previously been bonded to the body of the printer (16). The laser beam is caused to converge at a point in front of the nozzle plate (24) so that a nozzle is formed which tapers toward the outlet. First and second beam masks (72, 74) are established in front of a focussing lens with the masks being respectively conjugate in the lens with the nozzle inlet and outlet, which are of different shape. The nozzle has a central land (218) which controls the ink meniscus and avoids the ejected drop receiving a sideways kick from the nozzle wall.

68 Claims, 9 Drawing Sheets

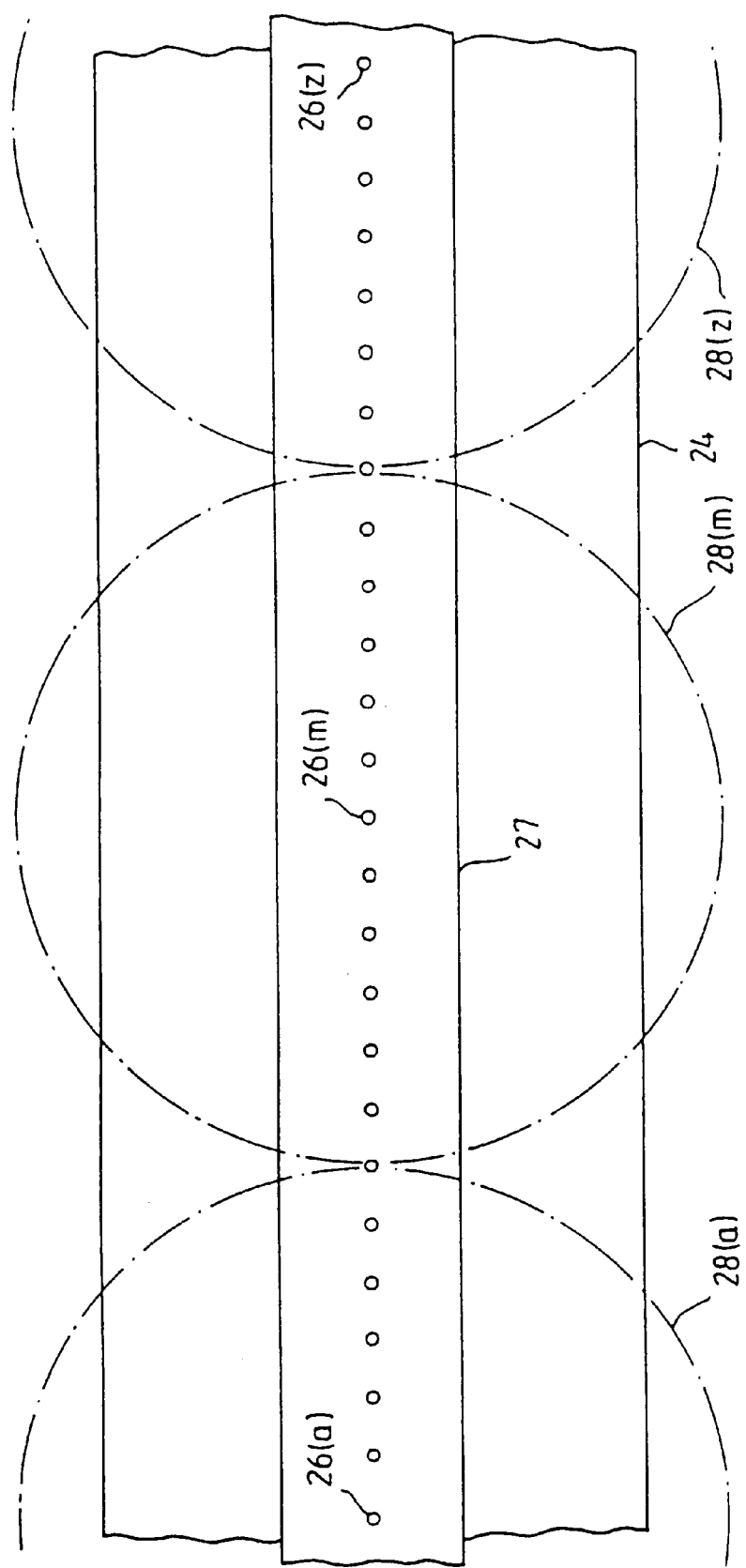

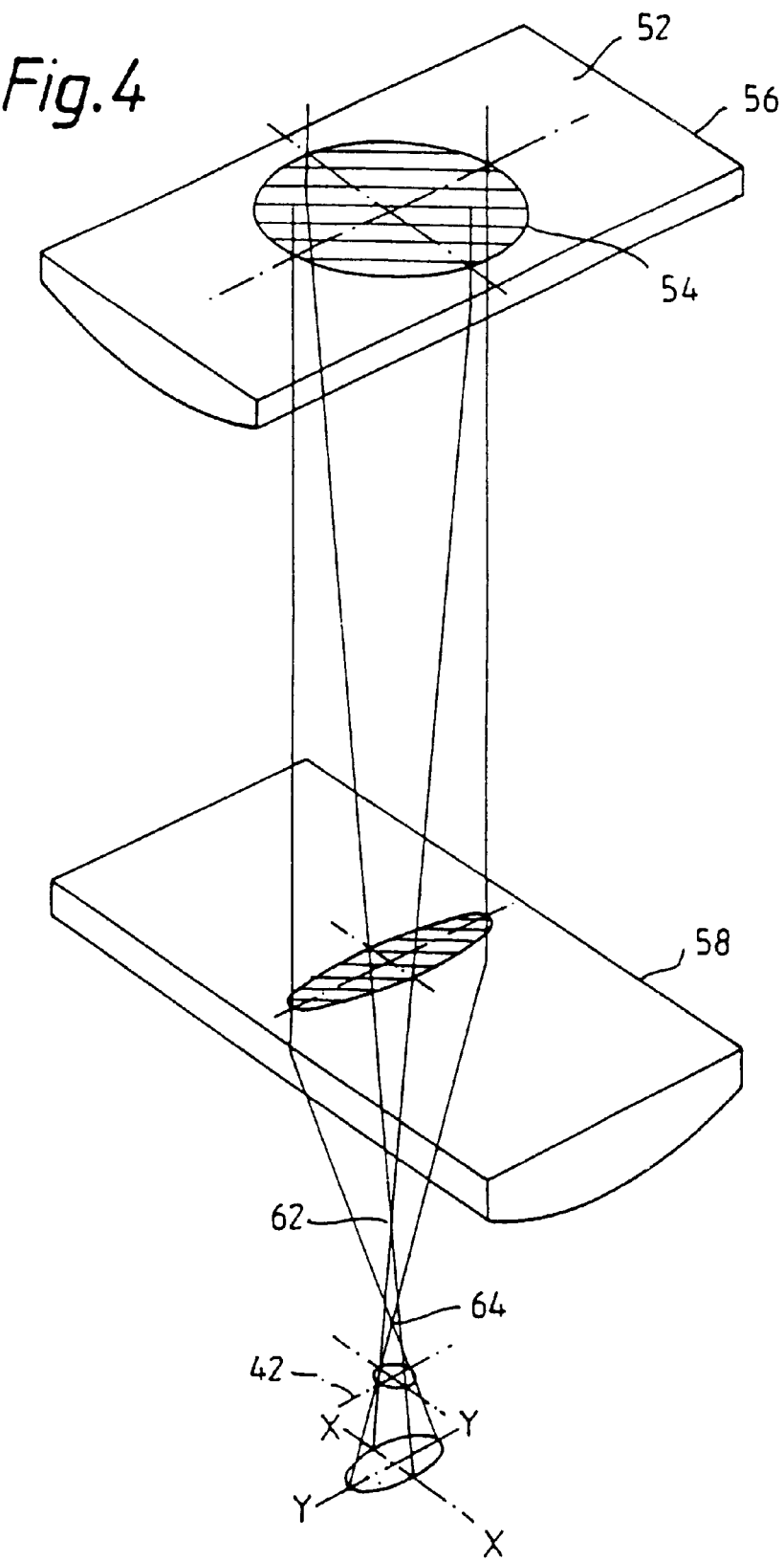

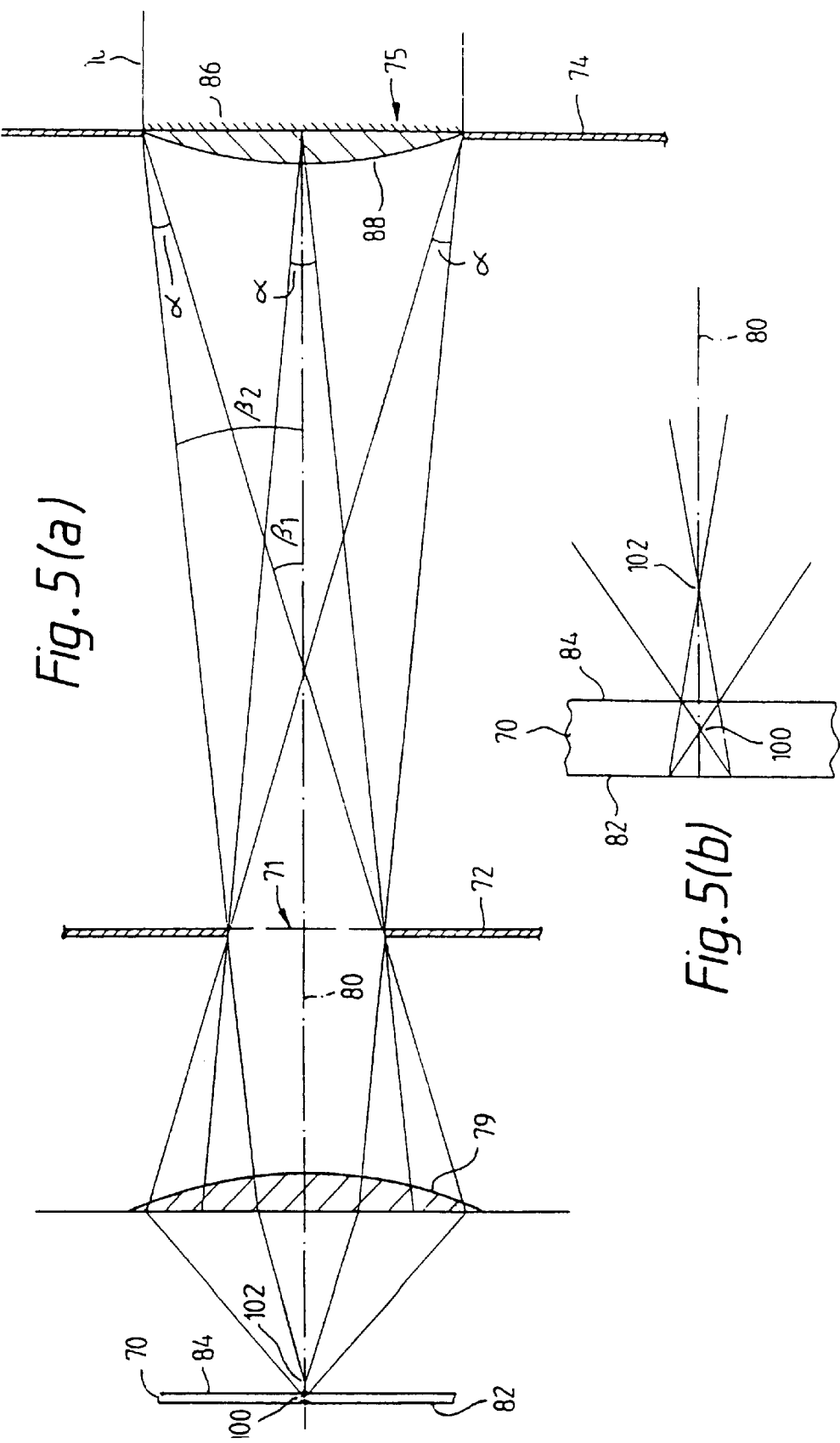

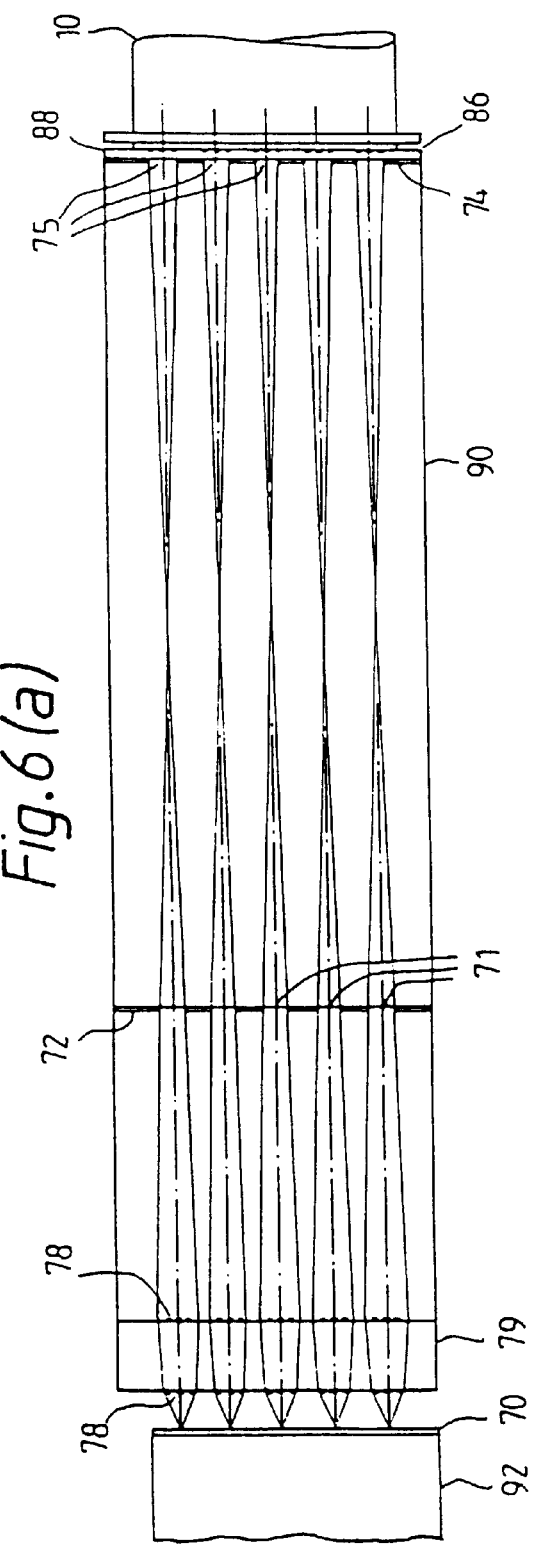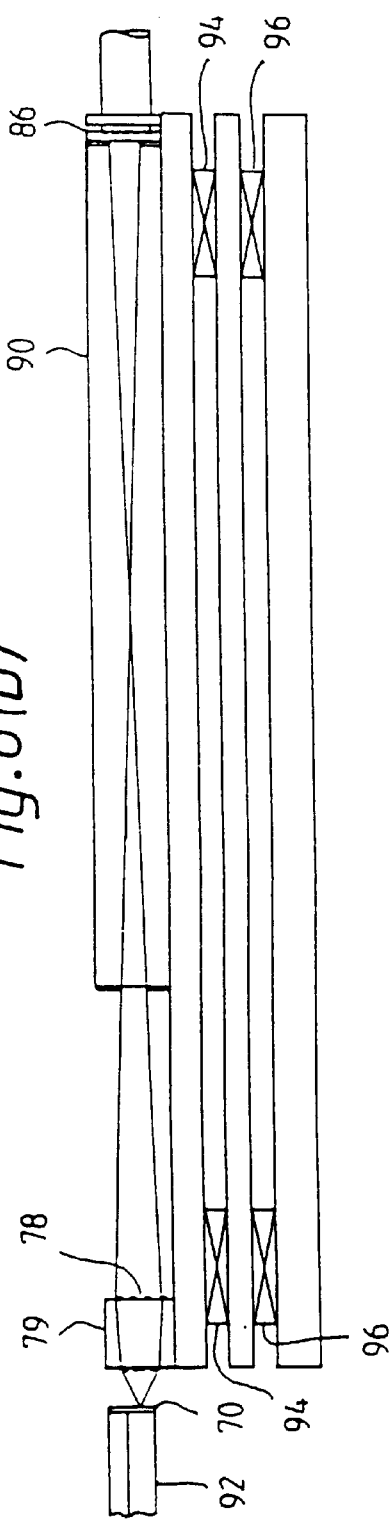

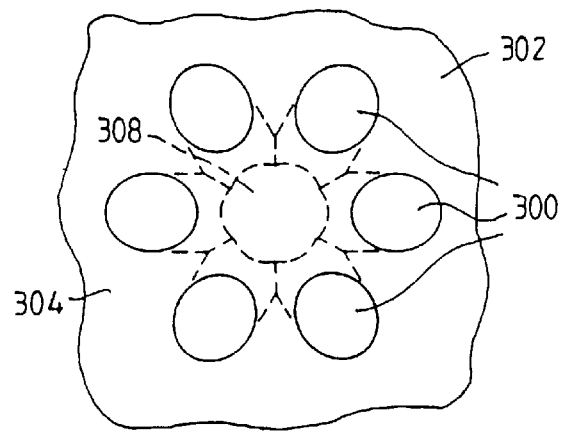
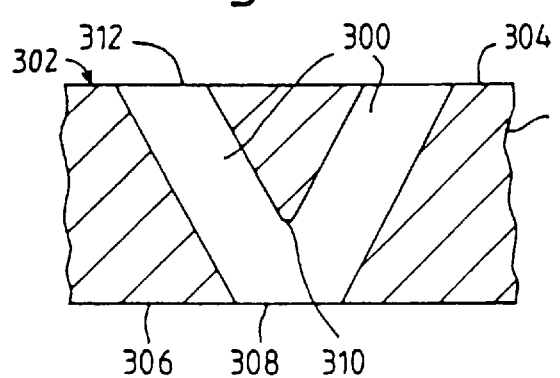
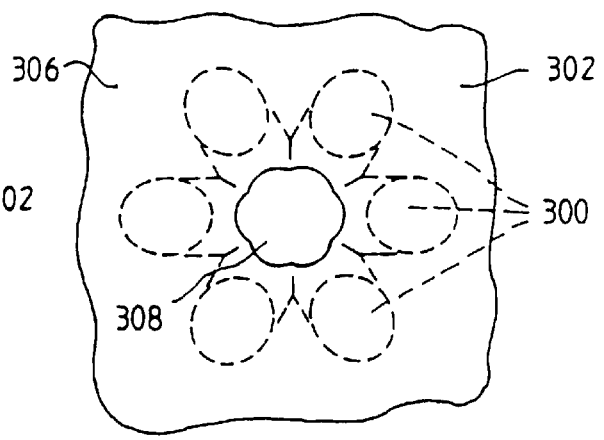

NOZZLES AND METHODS OF AND APPARATUS FOR FORMING NOZZLES

The present invention relates to methods and apparatus for forming the nozzles of ink jet printheads, particularly drop-on-demand ink jet printheads.

In particular the method involves forming nozzles after the nozzle plates are attached to the printhead into a generally conical shape tapered in the nozzle flow direction. The method employs a high energy beam, suitably, an UV ablating pulsed excimer laser incident on the exit face of the nozzle.

Since the initial proposals for drop-on-demand ink jet printers, as for example, in U.S. Pat. No. 3,946,398 (Kyser & Sears), it has been known to employ nozzles of a generally frusto-conical shape tapering towards the nozzle outlet. The geometry of the nozzles should be accurately made with regard to their location, exit area and direction of core axis in the nozzle plate in order to ensure uniform quality of printing by ink drops ejected from them. A single nozzle plate typically incorporates between 50–5000 nozzles which apply monochrome ink or a number of independent ink colours. Accurate placement of the nozzles in a uniform pattern within and between colourways on the nozzle plate also controls printing quality. The geometrical shape of the cone is further chosen with particular regard to the dynamic acoustic impedances of the ink in the nozzle in the ejection cycle, to minimise the energy of drop ejection and at the same time damp the residual acoustic energy in the channel in preparation for a further operating cycle.

The inlet section of the nozzle is also matched as far as possible to the ink channel section of the actuator behind it in order to prevent entrapment of air bubbles behind the nozzle plate which may disrupt operation of the printer. It is further generally accepted that it is necessary for the ink to wet the nozzle bore but to be non-wetting to the material of the nozzle plate exit face.

Accordingly, it is required to develop methods of nozzle manufacture whereby nozzles are formed with a well defined and precisely reproduced geometric shape and are arranged in defined locations within the nozzle plate with optical accuracy. A further requirement of the methods is that manufacture be continuous and rapid, capable of making several thousand printheads per day at extremely low cost.

In patent application EP-A-0 309 146 it is proposed, inter alia, to form the nozzles in the nozzle plate of an ink jet printhead following attachment of the nozzle plate, by exposing the exit face of the nozzle plate via an apertured mask to generally parallel beams of UV or high energy radiation and at the same time rocking the nozzle plate about axes normal to the radiation direction to form nozzles tapered towards the nozzle exit.

One disadvantage of the rocking method is that only a small fraction of the radiation which is exposed to the mask is usually applied to the nozzle plate for ablation, the greater part being reflected from or absorbed in the mask. Accordingly, the power of the high energy beam used for manufacture is not efficiently employed and production rates are accordingly reduced in the production process as a whole.

A further disadvantage is that the incoming parallel radiation when ablating the internal work face of the nozzle with the beam entering the exit aperture, is exposed to only a fraction of the work area owing to the rocking motion. Accordingly, a greater number of energy pulses, typically by an order of magnitude or more, is required to effect ablation of a nozzle than when ablation is applied uniformly in excess of the threshold ablation energy to the entire work area.

It is an object of the present invention to provide an improved method of and apparatus for forming a nozzle or nozzles in a nozzle plate of an ink jet printer. Another object is to form a novel kind of nozzle.

The present invention consists in one aspect in the method of forming a nozzle in a nozzle plate of an ink jet printer which has an inlet and an outlet in respective opposite faces of said plate and a bore which extends through said plate and tapers in the direction of said outlet, said method comprising directing a high energy beam towards a face of said plate in which said nozzle outlet is formed and focusing said beam so as to generate the nozzle bore in said plate with the desired taper.

Suitably, the method includes focussing at least some of the energy of the beam to a point towards which the nozzle bore converges.

In one form, the method of the invention further includes focussing said beam in two mutually inclined planes each containing the beam axis towards respective locations disposed in relation to said plate so as to cause said beam to diverge at different angles from said respective locations and to have an optical path through said plate such that the beam generates the nozzle bore with the desired taper.

In another aspect, the present invention consists in the method of forming a nozzle in a nozzle plate for an ink jet printer, comprising directing a high energy beam towards said nozzle plate, the beam passing through beam converging means prior to impingement thereof on the nozzle plate, characterised in that said beam in advance of said converging means is passed sequentially through first and second spaced apertured masks, the respective apertures of which are conjugate through the converging means with the outlet and the inlet of the nozzle formed by the beam.

Advantageously, said beam is directed at the face of the nozzle plate containing the outlet of the nozzle and wherein the nozzle tapers from the inlet to the outlet.

Suitably, the mask apertures can be of the same or different shapes. In one form, the aperture of the first mask means is of circular form and that of the second mask means is of rectangular form to provide a nozzle inlet which corresponds with the cross-section of the ink channel of the printer with which the nozzle connects.

Preferably, the method of the invention includes introducing a degree of divergence into said beam in advance of said first mask to increase the taper angle of the nozzle bore formed by the beam. Further, the angle of the beam divergence is equal to the angle subtended at the first mask aperture by the second mask aperture.

Advantageously, the method also includes converging the beam through the first mask by further beam converging means the focal length of which equals the distance between the mask apertures.

The invention also consists in apparatus for forming a nozzle in a nozzle plate of an ink jet printer which has an outlet and an inlet in respective opposite faces of said plate and a bore which extends through said plate and tapers in the direction of said outlet said apparatus comprising a source of a high energy beam, means for directing a beam from said source at the face of said plate in which said outlet is formed and beam converging means adapted to generate said nozzle bore with the desired taper in said plate.

Suitably, said beam converging means are adapted to focus at least some of the energy of said beam at a location towards which said nozzle bore converges.

In one form, said beam converging means are adapted to focus the said beam in each of two mutually inclined planes containing the beam axis towards respective locations disposed in relation to said plate so as to cause said beam to diverge from said respective locations and to have an optical path through said plate such that the beam generates the nozzle bore with the desired taper.

Advantageously, means for forming a series of nozzles in said plate comprise means for repeatedly translating the plate relatively to the beam after each nozzle is formed to the location of the next nozzle to be formed.

The invention also consists in apparatus for forming a nozzle in a nozzle plate for an ink jet printer, comprising a source of a high energy beam, means for directing a beam from said source at a face of said plate, beam converging means and first and second mask means formed with respective apertures through which said beam is passed prior to impingement on said nozzle plate, said apertures being mutually spaced and disposed in relation to said converging means so that said apertures are conjugate through the converging means respectively with the outlet and the inlet of the nozzle.

Suitably, the apertures of the masks can be of the same or different shapes.

Advantageously, means are provided for imparting a degree of divergence to the beam in each parallel optical system in advance of said first mask means to increase the taper angle of the nozzle formed by the beam.

Suitably, the angle of beam divergence is equal to the angle subtended at the first mask aperture by the second mask aperture. Preferably, further beam converging means adjacent said first mask means are provided through which said beam is passed and on which said beam diverging means are disposed, the focal length of said further converging means being equal to the distance between the mask apertures.

It is an object of a further aspect of this invention to provide an improved nozzle for an ink jet printer.

It is well understood that in the formation and ejection of an ink drop, the drop remains attached for a considerable period to the residual meniscus in the nozzle by a fluid ligament. This ligament extends progressively and ultimately breaks off at the time referred to as drop break-off. If—as is likely with no special precautions—the ink meniscus is withdrawn into the nozzle at drop break-off, then the tail of the drop may tend to be drawn up the concave meniscus surface onto the wall of the nozzle. The effect of any such attachment of the drop tail to the nozzle wall at break-off will be to give the ejected drop a sideways "kick" with the consequential risk of error in the drop landing position.

It is a more specific object of this aspect of the invention to provide an improved nozzle which deals with this problem.

Accordingly, the present invention consists, in this further aspect, in a nozzle for an ink jet printer, comprising a nozzle body; a nozzle bore extending through the nozzle body and a formation provided within the bore which serves to control the nozzle ink miniscus.

Advantageously, said formation comprises an axially located land positioned to control the location in the ink meniscus of the tail of an ejected ink drop at drop break-off.

Preferably, said formation further comprises a support structure extending radially outwardly from said land within the nozzle bore, the support structure being located wholly behind the land in the axial direction of ink drop ejection.

Suitably, with the nozzle having a nozzle inlet of greater area than the nozzle outlet, said formation divides the nozzle inlet into discrete inlet portions, the maximum dimension of each inlet portion being less than the minimum dimension of the nozzle outlet.

In one form of the invention, the formation extends across the bore to inhibit ink movement radially of the bore.

The invention will now be described by way of example by reference to the following diagrams, of which:

FIGS. 1(a) and (b) are respectively a plan view and a sectional view in the plane of the nozzle axes which illustrate the prior art method of nozzle manufacture by UV laser ablation using a contact mask and rocking the nozzle plate to provide a nozzle tapered towards the nozzle exit;

FIG. 2 shows in plan view a mask in which apertures are formed concentric with the axes of a fraction (shown as one in twelve) of evenly spaced nozzles in the nozzle plate;

FIG. 4 shows the nozzle and the optical radiation paths shown in FIG. 3 combined in isometric projection;

FIG. 5(a) shows (not to scale) an axial section of a nozzle formed by ablation and the optical paths through an improved optical projection system of the incident beam of UV excimer laser radiation from which the nozzle is formed;

FIG. 5(b) is a scrap view to an enlarged scale of part of FIG. 5(b);

Figure 7:
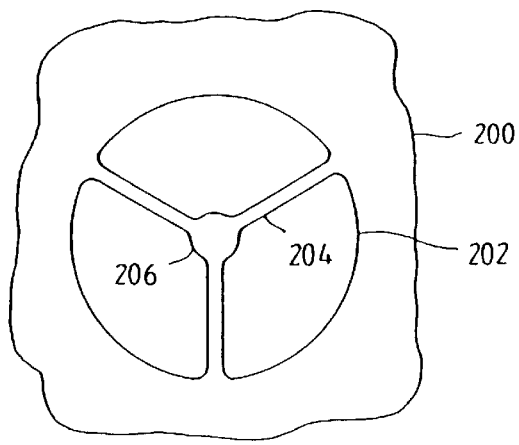
Figure 8:
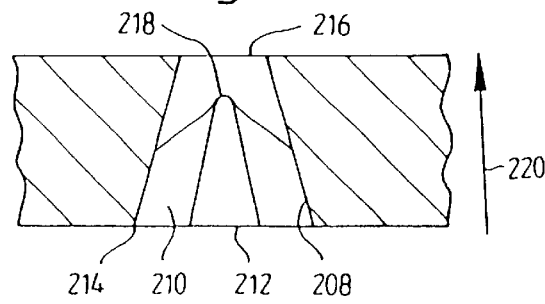
Figure 9:
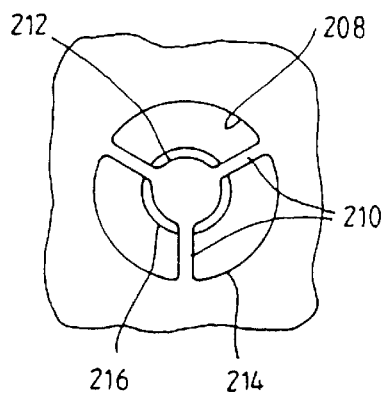

FIGS. 6(a) and (b) are sectional views mutually at right angles of an integrated optics lens system for parallel nozzle production in a printhead by the use of an array of individual lens systems of the form illustrated in FIG. 5(a);

FIG. 7 is a plan view of a mask for use in producing a nozzle according to this invention;

FIGS. 8 and 9 are, respectively sectional and plan views of a nozzle according to this invention;

FIGS. 10(a)–10(e) are diagrams illustrating the manner of drop formation and ejection from the nozzle shown in FIGS. 8 and 9; and FIGS. 11, 12 and 13 are respectively top plan, section, and bottom plan views of a further nozzle according to the present invention.

In the drawings, like parts are designated by the same reference numerals.

Figure 1A:
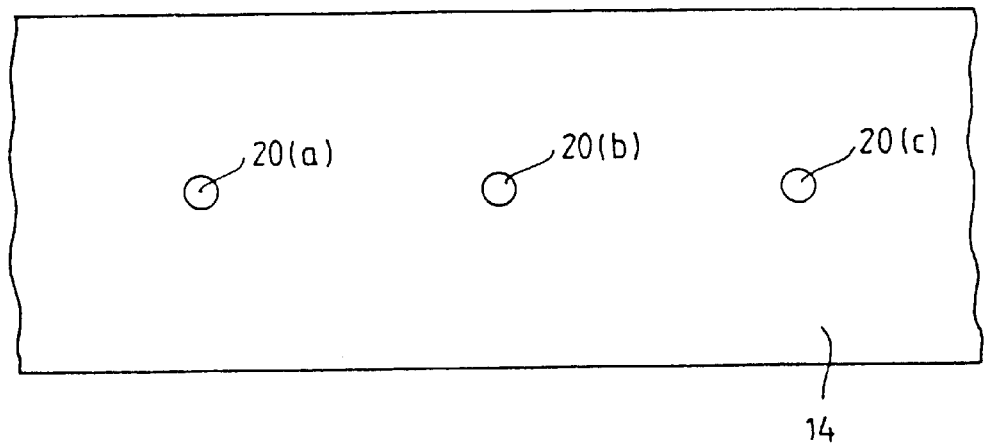
Figure 1B:
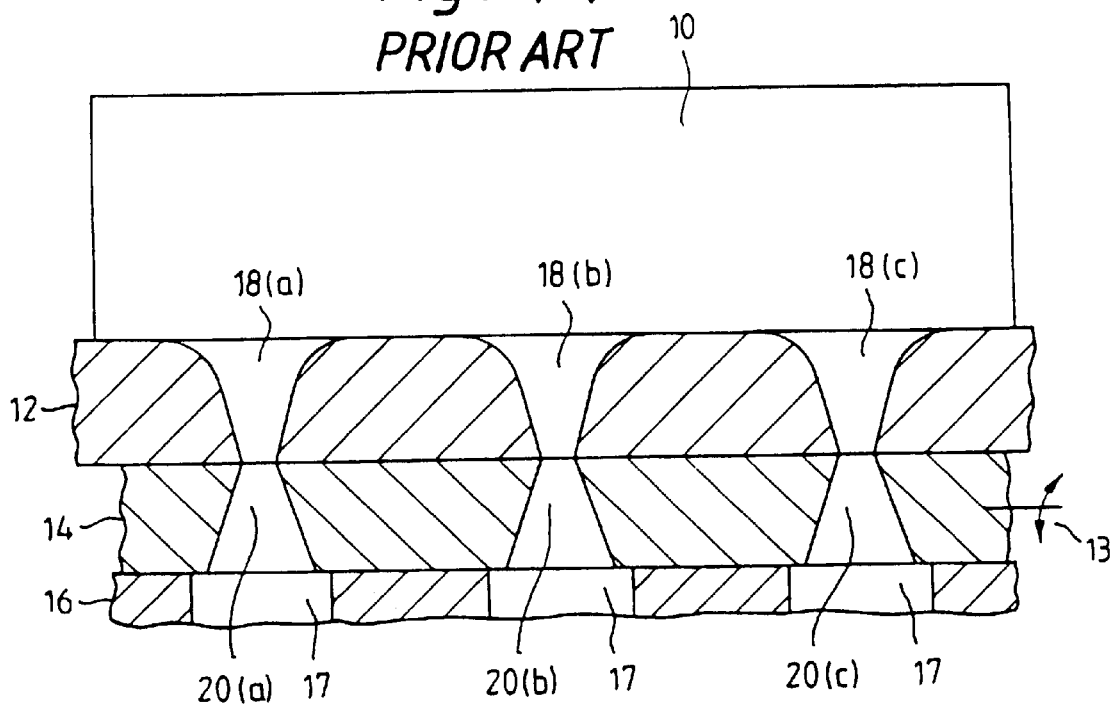

FIG. 1 illustrates one configuration of the prior art method or nozzle ablation using a collimated high energy beam 10 such as a UV excimer laser. The collimated beam 10 is directed against the mask 12 in which apertures 18(a), (b), (c) are formed. These expose the nozzle plate 14 attached to the printhead 16 in the region of nozzles 20(a), (b), (c) etc.

The collimated beam 10 is aimed in the direction of the nozzle axes and directs pulses of high energy UV radiation with energy density exceeding the ablation threshold of the nozzle plate material. Typically the material is a chemically inert polymer such as polyester or polyimide whose threshold energy density is in the range 0.2–0.5 mJcm$^{-2}$.

Continued exposure to energy pulses accordingly causes progressive ablation of the nozzles 20(a), (b), (c) so that by rocking the printhead 16 and nozzle plate 14 together with the mask 12 as indicated by the arrows 13, the nozzles bores are caused to be undercut, that is to say to be made with a taper in the nozzle exit direction. By rocking the nozzle plate unequally in two orthogonal axes the nozzle bore section can be suitably adjusted to match the section of the actuation channels 17 in the printhead 16 and to have the required nozzle exit area and exit cone axis direction.

As previously indicated this method of nozzle ablation employing rocking uses only a small fraction of the radiation exposed to the mask, and requires an additional number of ablation pulses to ablate each nozzle compared with direct ablation applied to the whole of the surface to be ablated.

FIG. 2 shows a nozzle plate 24 having a row of nozzle apertures 26(a)–(z). The area of the nozzle apertures is relatively small compared with the area of strip 27 of illumination of UV excimer radiation that would typically be exposed to the mask 12 to ablate these nozzles using a rocking motion.

In accordance with a principle of the present invention, a lower energy density of illumination is applied to the area of the nozzle plate, such that the energy per pulse previously applied to nozzles 26(a), 26(m), 26(z) is now applied to the areas 28(a), 28(m), 28(z); and the energy in these areas is focussed by a suitable lens system in each of these three nozzle axes to form the respective nozzles 26(a), 26(m) and 26(z) by direct ablation without rocking but using a suitable form of beam.

In this arrangement the energy per pulse per nozzle, is reduced by a factor of typically 100. At the same time the number of pulses that is sufficient to form a nozzle such as 26(m) during ablation by rocking is able to produce not only nozzle 26(m), but also the intervening nozzles 26(n)–26(y) each formed successively by direct ablation, by successively translating the nozzle plate laterally after each successive set of nozzles is formed.

Accordingly, using a direct ablation method via an apertured mask and a lens system for each nozzle ablated, enables the number of nozzles per unit time produced with the same UV excimer laser installation to be increased by a typical factor of 100. The cost of nozzle manufacture tends, also after depreciation of the cost of the additional lens optics, to be reduced by a factor of 100.

The method of direct ablation is described with reference to one nozzle by reference to FIGS. 3 and 4. In this method each nozzle is formed by a beam of high energy radiation, typically derived from an UV excimer laser, in which the beam is formed as a cone of high intensity radiation having the required shape to generate the nozzle profile to be ablated. Each cone of high energy radiation is formed with a separate mask and lens system per nozzle, and has an energy density in each section of the nozzle as great or greater than the ablation energy density threshold for the nozzle plate material.

Typically the nozzle plate material is an inert polymer material such as polyimide or polyester, whose ablation threshold is relatively lower than that of ceramic or metals otherwise commonly used for ink jet nozzle manufacture.

Figure 3:
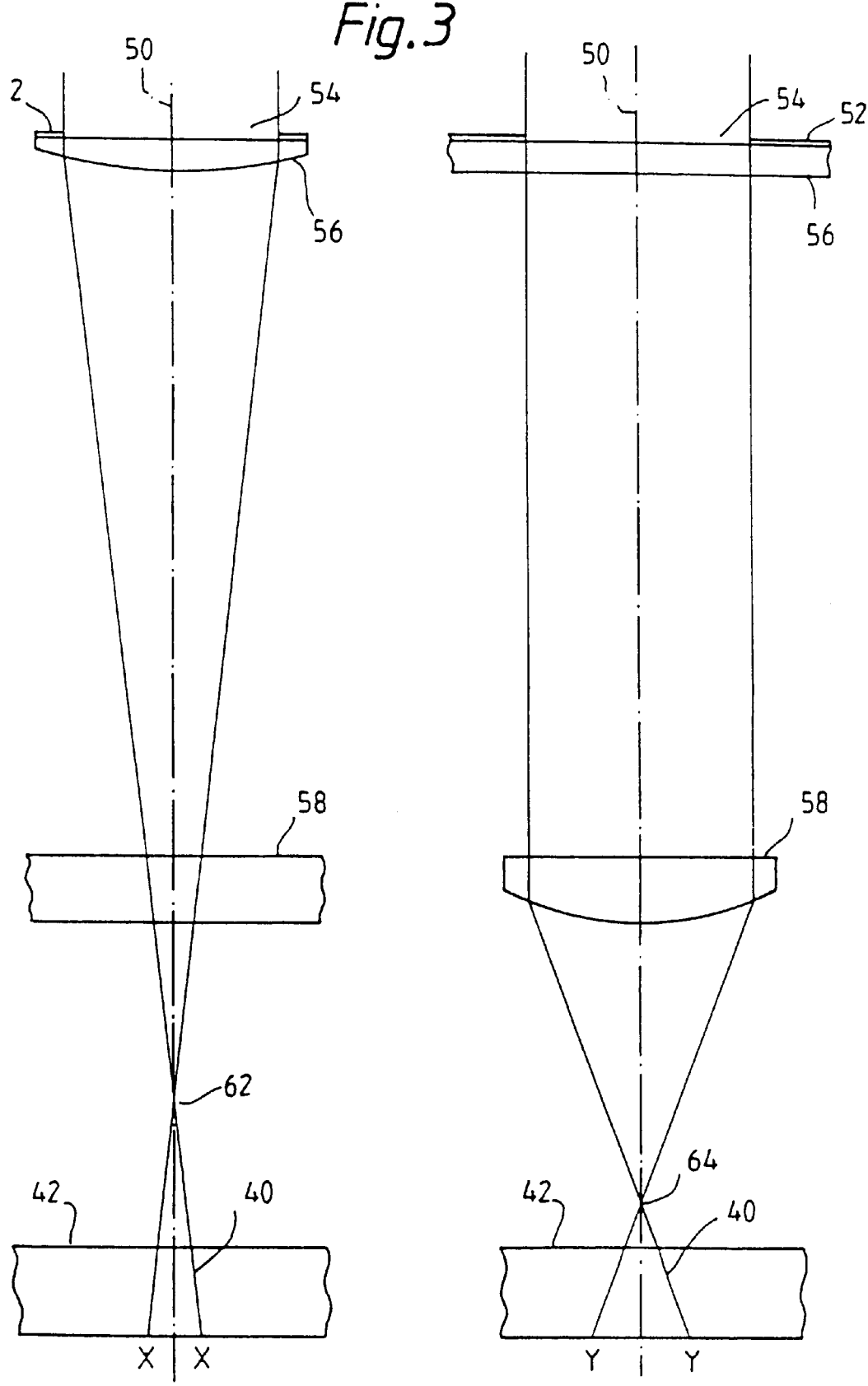
FIG. 3 shows, according to one embodiment of the invention, two orthogonal sections X—X and Y—Y of a nozzle formed by ablation and the optical paths of the incident beam of UV excimer radiation by which the nozzle is formed.

FIG. 3 shows two orthogonal sections of the nozzle 40 and the optical axis 50 of the direct ablation system. FIG. 4 shows the same sections in a combined isometric view.

In these figures, incoming collimated high energy radiation is applied to a mask 52, in which an aperture 54 is formed. The aperture 54 corresponds to the apertures 28(a), 28(m) or 28(z) in FIG. 2. Although drawn as a circular mask, it could be formed in other shapes such as ablate or rectangular, since it is not essential for the nozzle exit area to be circular.

The lens system is indicated in FIGS. 3 and 4 by two cylindrical lenses 56 and 58 located at suitable heights relative to the exit plane 42 of the nozzle plate. In order to control the size of the nozzle ablated in the nozzle plate material 44, a precise optical feedback system (not shown) is utilised to control the height of the plane 42 relative to the lens system 56,58.

Lens 56 is selected as regards its position, size and focal length to focus light on the axis 50 at a level 62 as indicated in FIG. 3. Consequently the incident radiation through mask aperture 54 and lens 56 forms a cone corresponding to the section of nozzle 40 shown in section X—X of FIG. 3.

At the same time lens 58 is selected as regards its position, size and focal length to focus light on axis 50 at level 64 as indicated in section Y—Y in FIG. 3. The incident radiation through mask aperture 54 and lens 58 in this section accordingly forms a cone corresponding to the section of nozzle 40 shown in section Y—Y of FIG. 3.

It will be evident that a wide variety of conical nozzle shapes can be formed in this manner by suitable choice of the lens positions, sizes and heights employed. It will further be apparent that if the focussing of the beam were effected by a spherical lens or lens system, a frusto-conically shaped nozzle could be formed.

Also, a wide variety of lens systems may be employed to develop the optical beam profile in accordance with the art. It will be evident that lens 58 is located in the path of the focussing bean from lens 56 and consequently experiences a higher energy density of radiation than lens 56. A material capable of passing the required radiation energy density is accordingly chosen for lens 58.

It will also be realised that the lenses 56 and 58 will be liable to significant spherical aberration, if they are formed as shown diagrammatically in FIGS. 3 and 4 in the form of a single lens each. To avoid such aberration, a common solution is to form each lens from a series of two or more members of a compound lens system. Such lenses may be either spherical or cylindrical in accordance with the lens system design. Also a parabolic lens surface curvature may be adopted which also compensates for spherical aberration.

The lenses indicated are of the simple solid curved component type that may be formed not only of glass but also of silica, sapphire, calcium fluoride or other material suitable for use in an UV optical system.

Further sorts of lens such as grating, zoneplate or gradient index lens or lens systems may also be used.

The high energy radiation from a UV excimer laser is usually characterised by beam divergence in the range ±1 m radians to ±5 m radians due to which the radiation into the aperture 54 of the system of FIGS. 3 and 4 is not in practice completely collimated. Accordingly the cone of concentrated radiation illustrated by section X—X and Y—Y in FIG. 3 becomes spread over and above the size of cone that would be predicted from ray optics assuming that the incident beam is collimated. The degree of spread depends on the distance between the aperture 54 and the nozzle 40. A small degree of additional spread also arises due to beam diffraction.

Figure 5C:
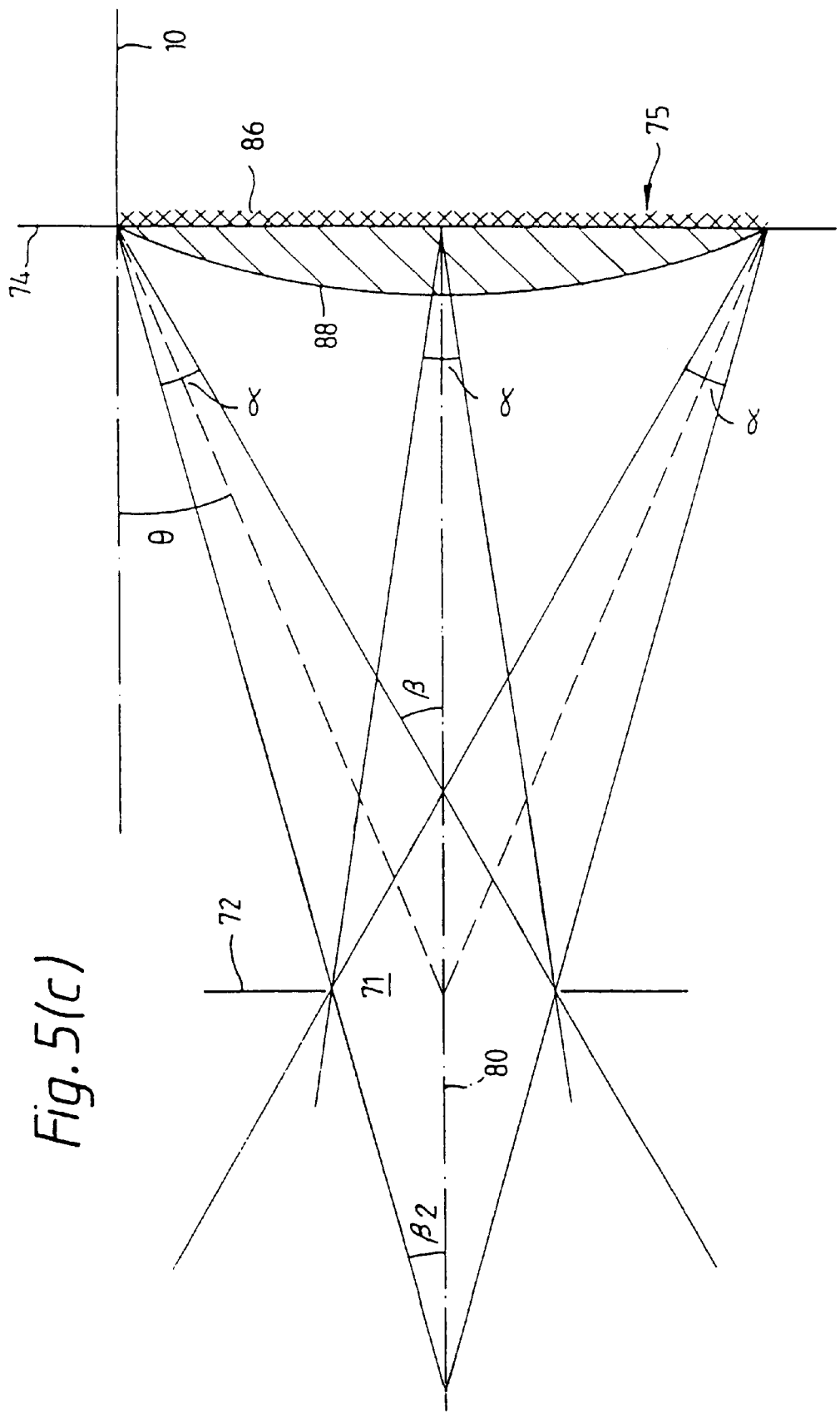
FIG. 5(c) is a view not to scale of a part of FIG. 5(a) and illustrates details of the optical geometry.

The spread due to beam divergence of the embodiment in FIGS. 3 and 4 is avoided in the conjugate arrangement disclosed in FIGS. 5(a)–(c).

The system described with reference to FIG. 3 is based on the assumption that the nozzle wall as it is ablated follows the geometrical profile of the incident radiation. In practice, however, it is found that the nozzle wall is formed at an angle relative to the light rays at the edges of the incident beam such that the wall is insufficiently undercut to provide the desired taper. As is well known, a parallel high energy beam directed at a plate produces a nozzle which tapers in the direction of the beam.

The nozzle taper angle, moreover, is not constant. It depends both on the nozzle plate material and the density of the radiation. Thus, the angle between the wall and the rays is relatively large at low energy density near the ablation threshold and is small at high energy densities.

One reason for this formation of the taper angle during ablation is that at a grazing incidence a significant proportion of the light, instead of being absorbed, is reflected, so that the edges are etched at a slower rate as the depth of the hole providing the nozzle increases. Even at the extreme of high fluence energy density the reduced undercut (which equates with the taper in the case of a parallel beam) is about 2–3 degrees.

A further reason for the formation of the reduced undercut taper angle is that the etch depth per radiation pulse is found to reduce with increasing depth of the nozzle hole particularly at low and medium fluence. If the reduction in material removed is associated with a lowering in the photon density arriving at the bottom of the etched hole, reduced undercut occurs at the same time. The main reason for the reduction per pulse of photons arriving at the bottom of the etched hole is believed to be absorption or refraction in the plume of ablation products in the hole. Further, in a tapered nozzle formed by a parallel beam, the plume is concentrated, which further increases the absorption in the plume of the incident high energy with consequent decrease in the taper angle.

In the case of the apparatus of FIGS. 3(a) and (b), the taper angle of the nozzle compared with the geometrical angle of the incident beam will be reduced by 2 to 3 degrees for high incident energy and by anything up to 10 to 15 degrees for lower energy, depending on the nozzle plate material and the aspect ratio of the nozzle.

In FIG. 5(a), the beam 10 of radiation is transmitted through a circular aperture 75 in a mask 74 by way of a convergent lens 88 which occupies the aperture and is shown as a plano-convex lens. In practice the lens 88 would be a compound convergent lens designed to avoid spherical aberration and formed by material which would transmit the radiation without appreciable absorption.

The beam 10 converged by the lens 88 passes first through an aperture 71 in a mask 72, the aperture being centred on the optical axis 80 of lens 88, and thereafter through a convergent lens 79 disposed coaxially with the lens 88, which is shown here as a plano-convex lens but which in practice would be a compound convergent lens for the same reason as given in respect of lens 88 and would also be made of low radiation absorption material. The focussed beam is incident upon the surface 84 of the nozzle plate 70.

The incident beam delivered by a UV excimer laser has a divergence but this is generally much less than the required angle α. Accordingly a layer 86 is placed against the lens 88 to increase to the angle α the divergence of the beam incident into the aperture. This layer may be a ground or etched surface or a thin film containing a medium having suitable light scattering properties, such as a colloid or opalescent material.

One objective of a direct ablation system providing projection optics for ablation is to employ the incident photon energy as efficiently as possible. Accordingly, it is desirable for the beam energy transmitted by the mask aperture 75 and focussed by lens 88 to be evenly distributed over the mask aperture 71. To this end a degree of divergence α is desirable which can be defined as the angle subtended by the mask aperture 71 at the mask 74.

Rays of the beam of incident radiation are shown at the periphery and centre of the beam as having a divergence angle α at the lens 88 created by the layer 86. The rays at the centre of the beam diverge at angle α from the lens to occupy fully the aperture 71 in the case where the latter is circular whilst the rays at the periphery of the beam are bent by the lens through the focussing angle θ (see FIG. 5(c), the value of which, as is plain from FIG. 5(b), is given by:

$$\theta = \beta_1 - 1/2\alpha = \frac{\beta_1 + \beta_2}{2}$$

where $\beta_1$ is the angle which the outer and $\beta_2$ is the angle which the inner extremity of the diverged peripheral ray (after diverging by the layer 86 and focussing by the lens 88) makes with the optical axis. In this way, the diverged peripheral ray passes through and fully occupies the aperture 71 in the mask 72.

After passage through the aperture 71, the rays of the radiation beam 10 are converged by the lens 79. As is seen in FIG. 5(a), the rays at the outer extremity of the diverged peripheral rays of the beam of radiation incident on the lens 88 pass, after focussing by lens 79, through a point 100 (see FIG. 5(c)) on the optical axis. From the point 100, they diverge to intersect surface 82 of nozzle plate 70 to define the inlet of the nozzle formed in the plate. Prior to intersection at the location 100, these rays intersect surface 84 of the nozzle plate to define the nozzle outlet. Also rays at the inner extremity of the diverged peripheral rays incident on lens 88 pass after focussing by lens 79 through a point 102 on the optical axis from which they diverge and intersect the surfaces 84 and 82 of the nozzle plate 70 also to define respectively the outlet and inlet of the nozzle. These rays further define in their passage through the plate 70, the bore of the nozzle.

The rays which are incident on the lens 88 at the optical axis, diverge from the lens 88 and thereafter from the aperture 71, and are incident upon and focussed by the lens 79 to locations on the nozzle outlet side of the point 100 and therefore pass through the plate 70 at points within the nozzle bore.

Thus it is apparent that the nozzle in the plate 70 can be ablated by rays which lie within the conical frustum extending between the apertures 75 and 71 of the masks 74 and 72. The conical frustum is therefore by way of lens 79 conjugate with the nozzle and apertures 75 and 71 are accordingly respectively conjugate with the nozzle outlet and inlet in the surfaces 84 and 82. In practice the nozzle inlet is preferably made rectangular to match the shape of the channel with which the nozzle communicates whilst the nozzle outlet is preferably circular. This means that whilst aperture 75 is circular, aperture 71 is rectangular.

As has been stated, one objective of a direct ablation system providing projection optics for ablation is to employ the incident photon energy as efficiently as possible. Accordingly it is desirable for layer 86 to have minimum back scatter, and as far as practical spread the incident radiation energy as uniformly as possible into the range of divergence defined by the angle α and at the same time to avoid spreading radiation into angles of divergence outside the angle α which will not be focussed into the focussing lens 79. It will be evident that the angle α is determined by the nozzle cone shape and also by the focal length of lens 78. The distance between the apertures 75 and 71 is equal to the focal length of the lens 88.

The angle of divergence α will vary in the orthogonal sections X—X and Y—Y in the nozzle, if the nozzle, as is usually the case to match the section of the channels 17, has unequal dimensions in the two sections. It will normally only be possible for the divergence of the beam to differ in the two sections if the layer 86 is suitably anistropic. However, in practice, the layer 88 will usually have uniform properties in the different orientations. Due to the divergence characteristics of practical materials used in the layer 86, compared with its ideal divergence properties, together with the other sources of loss indicated above, there will generally be a loss of incident energy in return for the improved geometrical accuracy of the nozzle profile provided by ablation using the embodiment of FIGS. 5(a) to (c).

FIGS. 6(a) and 6(b) illustrate an integrated optic lens system 90 for forming five nozzles which are uniformly spaced over the length of a serial (i.e. shuttle type) printhead 92 of an ink jet printer. After forming five nozzles on the nozzle axes as indicated the printhead 92 is indexed through one nozzle pitch and a further five nozzles are then formed. This operation is then repeated until all nozzles of the printhead are formed. The optical axes of the lens system are thus spaced at an integral multiple of the spacing of the nozzles required to be formed in the nozzle plate and the nozzles are formed in a number of stages equal to that multiple and between which the indexing of the printhead through one nozzle pitch takes place.

It will be evident that if the printhead is an array type of construction spanning a relatively greater width than serial printhead 92, then the integrated optics array 90 may be correspondingly wider and incorporate a correspondingly greater number of nozzle axes. Alternatively if the production system is one where a large number of serial printheads 90 are traversed end to end through the nozzle ablation system, then there may be a substantial number of integrated optics arrays side by side each with five (or another suitable number) of nozzle axes so that each integrated optics array is used to ablate a corresponding printhead, after which the printheads are removed and a further batch presented. In such arrangements high energy radiation can be presented to large numbers of nozzles in parallel.

In WO91/17051, assigned to the applicants, there is disclosed a nozzle forming mask. The integrated optics array 90 of FIGS. 6(a) and (b) is one possible form of the aforementioned mask. The base of the array 90 is therefore made up of a material, such as silicon or quartz, whose thermal expansion coefficient is low, being substantially matched to that of piezoelectric material (suitably, PZT), from which the printhead 92 is formed. The base is also of a material whereby an alignment mask for assembly of the component parts of an array printhead can be made from the same material and in register.

The integrated optics array 90 of FIGS. 6(a) and 6(b) is shown with UV laser beam 10 exposed to the layer 86, which causes the divergence of the input beam to be increased. The input radiation is then transmitted through each of the individual optical system by way of convergent lens 88, apertures 75 and 71 of masks 74 and 72 and converging system 79. Preferably, this system 79 takes zone plate form, having masks 78 deposited on opposing quartz surfaces. The converging system 79 thereby focuses the radiation into the plane of the nozzle plate 70 of the printhead. Suitably, the system 79 and mask 78 can be made in a form where they are common to all the parallel optical systems forming the array.

In order to ensure that the focussed radiation is at the correct height and attitude, the integrated array 90 is mounted on position control actuators 94 and 96 for vertical and horizontal as well as rotational movement. Typically these control systems maintain the nozzle tolerances required to ensure that in operation the ink drop velocity and volume are within defined limits.

There will now be described a novel nozzle structure which can be produced using methods in accordance with this invention, or in other ways.

Referring to FIG. 7, there is shown a modified mask 200 that can be substituted—for example—for the mask 72 in the arrangement of FIG. 5(a). The mask 200 has a circular aperture 202 with three radial vanes 204 and a central disc 206. When light passes a mask of this form and is used to generate a cone of radiant energy suitable for nozzle ablation, a structure is produced as shown in FIGS. 8 and 9. The nozzle bore 208 contains three radial webs 210 which support an axial pin 212. The webs 210 and the pin 212 taper in transverse dimension generally with the taper in the nozzle bore from the nozzle inlet 214 to the nozzle outlet 216, though as can be seen from FIG. 5(a), the angle of taper will vary across the mask a B¤1¤ and B¤2¤.

It must also be recognised that the shape of the nozzle which is ablated is not identical with the projection of the masks, as a result—among other things—of diffraction.

It will be seen that the tapering pin 212 and webs 210 do not extend fully to the nozzle exit plane. As shown in FIG. 8, the pin 212 terminates short of the nozzle outlet 216 providing a central land 218 which is less than a nozzle outlet diameter in distance from the nozzle outlet plane. The webs 210 are similarly cut back and it is important to note that the land 218 is the foremost part of the formation, in the direction of drop ejection arrowed at 220.

The land 218 serves an important function in controlling the tail of an ink drop as it is expelled from the nozzle.

Figures 10A, 10B, 10C, 10D, 10E:
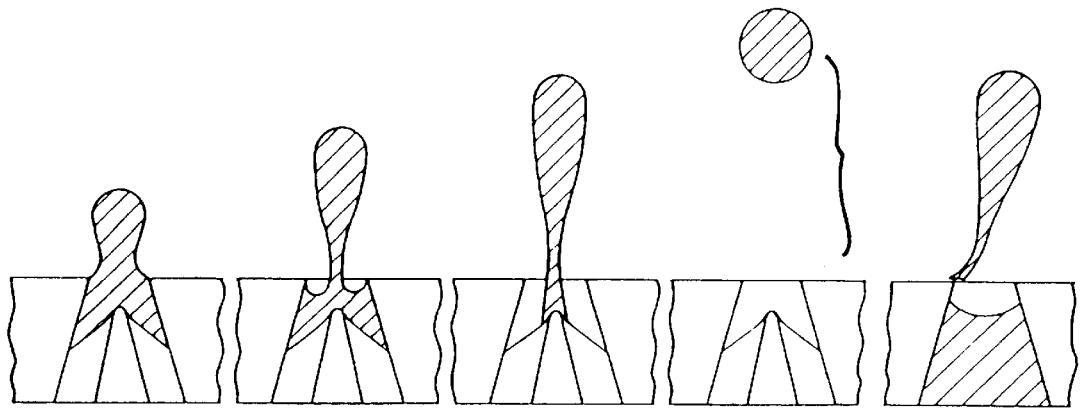

It is well understood that in the formation and ejection of an ink drop, the drop remains attached for a considerable period to the residual meniscus in the nozzle by a fluid ligament. This extends progressively and ultimately breaks off at the time referred to as drop break-off. If—as is likely with no special precautions—the ink meniscus is withdrawn into the nozzle at drop break-off, then the tail of the drop may tend to be drawn up the concave meniscus surface onto the wall of the nozzle. The effect of any such attachment of the drop tail to the nozzle wall at break-off will be to give the ejected drop a sideways "kick" with the consequential risk of error in the drop landing position. This problem is illustrated in FIG. 10(e).

In accordance with this feature of the present invention, the land 218 controls the ink meniscus in such a way that the drop tail is centralised in the nozzle at break-off. Referring to the sequence of FIGS. 10(a) to 10(d), it will seem that the ink meniscus is extended until a drop is formed which is connected to the body of ink remaining in the nozzle by a tail. As the periphery of the ink meniscus retracts into the nozzle bore, the tail is held captive on the land 218. With continuing extension and ultimate break-off of the drop, the risk of the drop receiving a sideways kick from contact with the nozzle plate is very much reduced.

A further advantage which the present invention provides in controlling the tail of an ejected drop, is that there is a reduced likelihood of small droplets of ink being left on the front surface of the nozzle plate. It will be seen that if the tail of the drop is in contact with the nozzle wall at break off, any small amount of ink which is not drawn foward with the tail to join the ejected drop, may remain on the front surface of the nozzle plate and dry. Such accumulations of dried ink on the nozzle plate can lead to drop placement errors and eventually to nozzle blockage. Since, in accordance with the present invention, the tail of the drop is centralised at break-off, any small amount of ink which is not drawn forward with the tail will remain on the central land to rejoin the body of ink within the nozzle on the next forward movement of the ink meniscus.

In a separate effect, the webs 210 are believed to serve the useful function of inhibiting ink movements in the radial direction. Unwanted transverse oscillations of the ink meniscus within the nozzle, have been observed under certain operating conditions. These waves travelling across the nozzle can trap air pockets leading to problems with bubbles in the ink. By inhibiting radial or transverse ink movements, the present invention reduces the likelihood of problems arising with bubbles.

The described arrangement of a pin providing a central land which is set back a nozzle diameter or less from the nozzle outlet and three angularly spaced supporting webs, is of course only one example of a formation within the nozzle bore which can serve to control the nozzle ink meniscus. In relatively minor modifications, the number, thickness and angular positioning of the webs can be varied to optimise the performance of a particular nozzle or nozzle array. By varying the projection geometry, the distance which the central land is set back from the nozzle may be adjusted. It is believed to be preferable for the amount of set-back to be not greater than about two nozzle diameters.

Whilst the described nozzle structure, with any of the above variations, can conveniently be produced using methods as hereinbefore described and discussed, a range of known nozzle manufacture techniques can alternatively be employed. Thus the prior art laser ablation and rocking technique of EP-A-0 309 146 may be adapted with the use of a mask as shown in FIG. 7, to produce a nozzle in accordance with this aspect of the invention. In this approach, the mask would be employed as a contact rather than a projection mask. The advantage would remain that nozzle formation was carried out from the nozzle outlet side of the nozzle plate, so that nozzles can be formed after bonding of the nozzle plate to the body of the printer. If this is not a requirement, other laser ablation or photoresist-based manufacturing techniques can be employed with suitable masking.

A further alternative nozzle manufacturing technique resulting in a rather different formation within the nozzle bore, will now be described with reference to FIGS. 11 and 12.

Using any appropriate technique, for example laser ablation or ion beam drilling, six inclined bores 300 are formed in the nozzle plate 302. At the inlet face 304 of the nozzle plate, the bores 300 are equivalently spaced on a common radius. At the outlet face 306, the bores coalesce to form a nozzle outlet 308 which can be seen to be the envelope of six ellipses. Within the body of the nozzle plate, a central land 310 is defined with supporting webs 312 of complex form. In operation of the so-formed nozzle, the land 310 and webs 312 function in the same manner as land 218 and webs 210 of the previously described embodiment.

It will be recognised that the combined nozzle inlet area, being the sum of the areas of the bores 300 as projected onto the nozzle inlet face, is greater than the nozzle outlet area, meeting the functional requirement of a tapering nozzle. However, each bore has an inlet which is smaller than the common outlet. This means that any particles in the ink which are large enough to block the nozzle cutlet are prevented form entering the nozzle. The nozzle structure can thus be seen to combine the features of a tapering nozzle and a particle filter.

In fact, this feature of filtering out particles in the ink which would block the nozzle outlet, can be provided in a nozzle such as that shown in FIGS. 8 and 9, by appropriate choice of the mask dimensions.

The described multi-bore nozzle can be produced using a high energy beam in six passes with the angle and position of the nozzle plate being incremented between passes. There will in certain cases be advantage in combining a method such as described above in relation to FIG. 3 or FIG. 5 with such an approach. An alternative is to employ in place of the projection mask shown in FIG. 7, a projection mask having a series of, say, six holes equiangularly spaced on a common radius. Still further alternatives will occur to the skilled man.

We claim:

1. The method of forming a nozzle in a nozzle plate of an ink jet printer which has an inlet and an outlet in respective opposite faces of said plate and a nozzle bore which extends through said plate and tapers towards said outlet, said method comprising the steps of directing a high energy beam along a beam direction towards a face of said plate in which said nozzle outlet is formed and focusing said beam so as to provide at said plate a beam shape tapering in a direction opposite to the beam direction thereby to generate the nozzle bore in said plate tapering towards said outlet.

2. The method claimed in claim 1, including the step of focusing said beam such that the beam tapers to a point located in front of the plate in which said nozzle outlet is formed.

3. The method claimed in claim 1, wherein said beam has an axis, said method including the step of focusing said beam in two mutually inclined planes each containing the beam axis towards respective locations disposed in relation to said plate so as to cause said beam to diverge at different angles from said respective locations and to have an optical path through said plate such that the beam generates the nozzle bore with the desired taper.

4. The method claimed in claim 3, including the step of disposing said mutually inclined planes at right angles.

5. The method claimed in claim 3 including the step of disposing said mutually inclined planes so that they intersect along the axis of the nozzle bore.

6. The method claimed in claim 1, including the step of forming a plurality of similar nozzles in said plate by forming a first nozzle, and translating the nozzle plate relatively to the beam so as mutually to locate the beam and the plate to enable formation by the beam of a further nozzle.

7. The method claimed in claim 6, including the step of repeatedly translating the nozzle plate relatively to the beam after formation of said first nozzle so as mutually to locate the beam and the plate to enable formation of said further nozzle with its axis parallel with that of the first nozzle.

8. The method claimed in claim 6, including the step of forming a series of nozzles by repeatedly translating the plate relatively to the beam after each nozzle is formed to the location of the next nozzle to be formed.

9. The method claimed in claim 1, including the step of passing said beam through an apertured mask prior to focusing thereof to provide the beam with a cross-section which, after focusing, is reduced substantially to a cross-section of the nozzle to be formed.

10. The method claimed in claim 1, including the step of employing as the high energy beam a pulsed UV excimer laser.

11. The method claimed in claim 1, including the step of operatively securing said nozzle plate on the printer prior to forming a nozzle therein.

12. The method of forming a nozzle in a nozzle plate for an ink jet printer which has an inlet and an outlet in respective opposite faces of said plate, comprising directing a high energy beam towards said nozzle plate, the beam passing through beam converging means prior to impingement thereof on the nozzle plate, characterised by passing said beam in advance of said converging means sequentially through first and second spaced apertured masks having first and second apertures respectively, said first and second apertures being imaged through the converging means as the outlet and the inlet of the nozzle formed by the beam.

13. The method according to claim 12, including the step of directing said beam at the face of the nozzle plate containing the outlet of the nozzle and wherein the nozzle tapers at a taper angle from the inlet to the outlet.

14. The method claimed in claim 12, including the step of disposing said apertures and said converging means coaxially with the nozzle bore to be formed by said beam.

15. The method claimed in claim 12, including the step of providing said apertures of the masks each of circular form.

16. The method claimed in claim 12, including the step of providing said aperture of said second mask of a different shape from that of the aperture of the first mask.

17. The method claimed in claim 12, including the stop of forming the aperture of the first mask of circular form and the aperture of the second mask of rectangular form.

18. The method claimed in claim 16, including the step of forming the aperture in the second mask of rectangular form to match a cross-section of an ink channel of the printer at an end of which a nozzle is to be formed.

19. The method claimed in claim 12, including the step of introducing a degree of divergence into said beam in advance of said first mask to increase the taper angle of the nozzle bore formed by the beam.

20. The method claimed in claim 19, including the step of employing beam scattering means to impart said divergence to the beam.

21. The method claimed in claim 19, wherein said beam diverges at an angle, said method including the step of making said angle equal to an angle subtended at the first mask aperture by the second mask aperture.

22. The method claimed in claim 12, including the step of converging the beam through the first mask by further beam converging means having a focal length equal to a distance between the mask apertures.

23. The method claimed in claim 12, including the step of employing a pulsed UV excimer laser as the high energy beam.

24. The method of forming a series of like nozzles in a nozzle plate of an ink jet printer, said nozzles each having an inlet and a outlet in opposite first and second faces of said plate respectively and a bore between said inlet and said outlet which tapers towards said outlet with a desired nozzle taper, said method comprising the steps of directing a high energy beam along a path towards said second face of said nozzle plate in which the nozzle outlets are formed, interposing in said path of said beam a plurality of parallel optical systems having their optical axes disposed at a spacing equal to a spacing of the nozzles which they form, each such system having first beam converging means located in said path of said beam, mask means formed with an aperture through which passes a substantial part at least of said beam after focusing thereof by said first beam converging means and second beam converging means between said mask means and said plate to focus said beam so as to generate in said plate said desired nozzle taper, the outlet of said nozzle being conjugate through said second converging means with said aperture, and employing said systems to form said nozzles.

25. The method claimed in claim 24, including the step of introducing a predetermined degree of divergence into said beam in advance of said mask means so that in each of said optical systems the beam fully occupies the aperture in the mask means following convergence of the beam through the first beam converging means.

26. The method claimed in claim 25, wherein said first beam converging means has a focal length, said method including the step of disposing in each said parallel optical system further mask means formed with an aperture and located in relation to said first beam converging means so that the apertures of the mask means and further mask means are separated by a distance equal to said focal length of the first beam converging means whereby the apertures of the mask means and further mask means are conjugate through the second beam converging means respectively with the corresponding nozzle inlet and outlet.

27. The method claimed in claim 24, including the step of disposing the optical axes of said optical systems at a pitch equal to a multiple of a pitch at which the nozzles are to be formed and forming said nozzles in stages at each of which each system forms a nozzle and between which the nozzle plate and the optical systems are relatively indexed by one nozzle pitch, there being as many stages as said multiple by which the pitch of said optical axes exceeds that of the nozzles.

28. The method claimed in claim 24 including the step of employing a pulsed UV excimer laser as the high energy beam.

29. The method of forming a series of like nozzles in each of a plurality of like nozzle plates disposed one alongside another, each nozzle plate having nozzles each having in turn an inlet and an outlet in opposite faces of said nozzle plate and a bore between said inlet and said outlet which tapers towards said outlet with a desired nozzle taper, said method comprising the steps of directing a high energy beam along a path towards the face of said nozzle plates in which the nozzle outlets are formed, interposing a plurality of parallel optical systems, each having an optical axis, respectively disposed over the nozzle plates with said optical axes extending respectively along the axes of the bores of the nozzles to be formed, each optical system including first beam converging means in the path of said beam, mask means formed with an aperture through which passes a substantial part at least of said beam after focusing thereof by said first beam converging means, and second beam converging means between said mask means and the corresponding nozzle plate to focus said beam so as to generate in said corresponding plate said desired nozzle taper, the outlet of the nozzle being conjugate through said second converging means with said aperture and employing said systems to form said nozzles.

30. The method claimed in claim 26, including the step of forming the nozzles in the nozzle plates in stages at each of which nozzles are formed by respective optical systems in the nozzle plates and between said stages the nozzle plates are indexed through one pitch of the nozzles formed in each of the plates, there being as many stages as there are nozzles formed in each of the nozzle plates.

31. The method claimed in claim 29, including the step of introducing into said beam in advance of said mask means a predetermined degree of divergence so that in each of said optical systems the beam after convergence thereof through the first beam converging means fully occupies the aperture in the mask means.

32. The method claimed in claim 31, including the step of disposing in each said parallel optical system further mask means formed with an aperture and located in relation to said first beam converging means so that the distance between the apertures of the mask means and further means equals a focal length of the first beam converging means whereby the apertures of the mask means and further mask means are conjugated through the second beam converging means respectively with the corresponding nozzle inlet and outlet.

33. The method claimed in claim 29 including the step of employing a pulsed UV excimer laser as the high energy beam.

34. Apparatus for forming a nozzle in a nozzle plate of an ink jet printer which has an inlet and an outlet in respective opposite faces of said plate and a nozzle bore which extends through said plate and tapers towards said outlet, said apparatus comprising a source of a high energy beam, means for directing a beam from said source along a beam direction at a face of said plate in which said nozzle outlet is formed and beam converging means providing at said plate a beam share tapering in a direction opposite to the beam direction thereby to generate said nozzle bore in said plate tapering towards said outlet.

35. Apparatus as claimed in claim 34, wherein said beam converging means are adapted to focus at least some of the energy of said beam at a location towards which said nozzle bore converges.

36. Apparatus as claimed in claim 34, wherein said beam has an axis, and wherein said beam converging means focus said beam in each of two mutually inclined planes containing the beam axis towards respective locations disposed in relation to said plate so as to cause said beam to diverge from said respective locations and to have an optical path through said plate such that the beam generates the nozzle bore tapering towards said outlet.

37. Apparatus as claimed in claim 34, wherein means for forming a series of nozzles in said plate comprise means for repeatedly translating the plate relatively to the beam after each nozzle is formed to the location of the next nozzle to be formed.

38. Apparatus as claimed in claim 34, wherein mask means formed with an aperture are provided through which said beam is passed in advance of the beam converging means.

39. Apparatus as claimed in claim 34 wherein the source of the high energy beam is a source of a pulsed excimer laser beam.

40. Apparatus for forming a nozzle in a nozzle plate for an ink jet printer which has an inlet and an outlet in respective opposite faces of said plate, comprising a source of a high energy beam, means for directing a beam from said source at a face of said nozzle plate, beam converging means and first and second masks formed with respective apertures through which said beam is passed prior to impingement on said nozzle plate, said apertures being disposed so that said apertures are imaged through the converging means respectively an the outlet and the inlet of the nozzle formed by the beam.

41. Apparatus as claimed in claim 40, wherein said apertures are of circular form.

42. Apparatus as claimed in claim 40, wherein said aperture of said second mask means is of a different shape from the aperture of said first mask means.

43. Apparatus as claimed in claim 42, wherein the aperture of the first mask means is circular and that of the second mask means is rectangular.

44. Apparatus as claimed in claim 40, wherein means are provided for imparting an angle of divergence to the beam in each parallel optical system in advance of said first mask means.

45. Apparatus as claimed in claim 44, wherein the angle of beam divergence is equal to an angle subtended at the first mask aperture by the second mask aperture.

46. Apparatus as claimed in claim 44, wherein further beam converging means adjacent said first mask means are provided through which said beam is passed on and which said beam diverging means are disposed, the focal length of said further converging means being equal to the distance between the mask apertures.

47. Apparatus as claimed in claim 40 wherein the source of the high energy beam is a source of a pulsed excimer laser beam.

48. Apparatus for forming a series of like nozzles in a nozzle plate of an ink jet printer, said nozzles each having an inlet and a outlet in opposite first and second faces of said plate respectively and a bore between said inlet and said outlet which tapers towards said outlet with a desired nozzle taper, comprising a source of a high energy beam, means for directing said beam along a path towards said second face of said nozzle plate in which the nozzle outlets are formed, a plurality of parallel optical systems interposed in said path of said beam and having their optical axes disposed at a spacing equal to a spacing of the nozzles which they form, each such system comprising first beam converging means located in the path of said beam, mask means formed with an aperture through which passes a substantial part at least of said beam after focusing thereof by said first beam converging means and second beam converging means between said mask means and said plate for focusing the beam so as to generate in said plate said desired nozzle taper, the outlet of said nozzle being conjugate through said second converging means with said aperture.

49. Apparatus as claimed in claim 46, wherein means are provided in advance of said mask means for introducing a predetermined degree of divergence so that in each of the parallel optical systems the beam after convergence thereof through the first beam converging means fully occupies the aperture in the mask means.

50. Apparatus as claimed in claim 49, wherein said first beam converging means has a focal length and each of the parallel optical systems is provided with further mask means which are formed with an aperture and located in relation to said first beam converging means so that the apertures of the mask means and further mask means are separated by a distance equal to said focal length of the first beam converging means whereby the apertures of the mask means and further mask means are conjugate through the second beam converging means respectively with the corresponding nozzle inlet and outlet.

51. Apparatus as claimed in claim 48, wherein a pitch of the optical axes of said optical systems is a multiple of the pitch of the nozzles and means are provided for relatively indexing by one nozzle pitch the nozzle plate and said optical systems so that the nozzles can be formed in a number of stages equal to the multiple by which the pitch of the optical axes of said optical systems exceeds that of the nozzles.

52. Apparatus as claimed in claim 50 wherein the source of the high energy beam is a source of a pulsed excimer laser beam.

53. Apparatus for forming a series of like nozzles in each of a plurality of like nozzle plates disposed one alongside another, each nozzle plate having nozzles each having in turn an inlet and an outlet in opposite faces of the nozzle plate and a bore between said inlet and said outlet which tapers towards said outlet with a desired nozzle taper, comprising a source of a high energy beam, means for directing said beam along a path towards the faces of said nozzle plates in which said nozzle outlets are formed, and a plurality of parallel optical systems, each having an optical axis, respectively disposed over the nozzle plates with said optical axes extending respectively along axes of the nozzle bores to be formed, each optical system including first beam converging means in the path of said beam, mask means formed with an aperture through which passes a substantial part at least of said beam after focusing thereof by said first beam converging means and second beam converging means between said mask means and the nozzle plate to focus said beam so as to generate in said nozzle plate said desired nozzle taper, the outlet of the nozzle being conjugate through said second converging means with said aperture.

54. Apparatus as claimed in claim 53, wherein there are provided indexing means for relatively indexing the nozzle plates and the optical system through one nozzle pitch so that the nozzles can be formed in a number of stages, there being one said stage for each of the nozzles in each nozzle plate.

55. Apparatus as claimed in claim 53, wherein means are provided for imparting an angle of divergence to the beam in each parallel optical system in advance of said first mask means to increase the taper of the nozzle formed by the beam.

56. Apparatus as claimed in claim 55, wherein the angle of beam divergence is equal to an angle subtended at the first mask aperture by the second mask aperture.

57. Apparatus as claimed in claim 53 wherein the source of the high energy beam is a source of a pulsed excimer laser beam.

58. A nozzle for the election of ink drops in an ink jet printer, comprising a nozzle body; a nozzle bore having an axis and extending through the nozzle body for containing an ink meniscus which on election of an ink drop remains until drop break-off connected through a tail to the ink drop and a formation provided within the bore, said formation comprising an axially located land positioned to locate axially the tail of an ejected ink drop in the ink meniscus.

59. A nozzle according to claim 58, wherein the nozzle bore defines a nozzle outlet through which ink drops are elected in a direction on ink drop election, the nozzle outlet having a width and wherein the land is positioned behind the nozzle outlet in the direction of ink drop ejection by a distance which is not substantially greater than twice the width of the nozzle outlet.

60. A nozzle according to claim 51, wherein the land is positioned behind the nozzle outlet in the axial direction of ink drop ejection by a distance which is not substantially greater than the width of the nozzle outlet.

61. A nozzle according to claim 58, wherein said formation further comprises a support structure extending radially outwardly from said land within the nozzle bore, the support structure being located wholly behind the land in the axial direction of ink drop ejection.

62. A nozzle according to claim 61, wherein said support structure comprises one or more radially extending webs.

63. A nozzle according to claim 62, having a nozzle inlet of greater area than the nozzle outlet, wherein said formation divides the nozzle inlet into discrete inlet portions each of less area than the nozzle outlet.

64. A nozzle according to claim 58, wherein the formation extends across the bore to inhibit ink movement radially of the bore.

65. The method of forming a nozzle in a nozzle plate of an ink jet printer, said nozzle having an inlet and an outlet in opposite faces of said plate and a bore between said inlet and said outlet which tapers toward said outlet, the method comprising the steps of directing a high energy beam towards a face of said nozzle plate in which the nozzle outlet is formed, passing said beam through first beam converging means in the path of said beam, passing said beam through mask means formed with an aperture through which passes at least a substantial part of said beam after focusing thereof by said first beam converging means and passing said beam through second beam converging means between said mask means and said plate to focus said beam so as to generate in said plate said nozzle tapering towards said outlet.

66. The method claimed in claim 65, including the step of introducing into said beam in advance of said mask means a predetermined degree of divergence so that the beam after convergence thereof through the first beam converging means fully occupies the aperture in the mask means.

67. Apparatus for forming a nozzle in a nozzle plate of an ink jet printer, said nozzle having an inlet and an outlet in opposite faces of said plate and a bore between said inlet and said outlet which converges in the direction of said outlet, the apparatus comprising a source of a high energy beam, said beam being directed towards the face of said nozzle plate in which the nozzle outlets are formed, first beam converging means in the path of said beam, mask means formed with an aperture through which passes a substantial part at least of said beam after focussing thereof by said first beam converging means and second beam converging means between said mask means and said plate for focussing the beam so as to generate in said plate said nozzle tapering towards said outlet.

68. Apparatus as claimed in claim 67, wherein means are provided in advance of said mask means for introducing a predetermined degree of divergence so that the beam after convergence thereof through the first beam converging means fully occupies the aperture in the mask means.

* * * * *